United States Patent
Schneider et al.

(10) Patent No.: US 7,146,798 B2
(45) Date of Patent: Dec. 12, 2006

(54) METHOD FOR CONTROL OF A DIAGNOSIS OF A CATALYST IN THE EXHAUST OF AN INTERNAL COMBUSTION ENGINE

(75) Inventors: Erich Schneider, Kirchheim (DE); Andreas Blumenstock, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 10/433,982

(22) PCT Filed: Dec. 22, 2001

(86) PCT No.: PCT/DE01/04920

§ 371 (c)(1),
(2), (4) Date: Apr. 2, 2002

(87) PCT Pub. No.: WO02/053892

PCT Pub. Date: Jul. 11, 2002

(65) Prior Publication Data
US 2005/0022507 A1    Feb. 3, 2005

(30) Foreign Application Priority Data
Dec. 28, 2002 (DE) ............... 100 65 123

(51) Int. Cl.
*F01N 3/00* (2006.01)
(52) U.S. Cl. ............... 60/277; 60/274; 60/276; 60/284; 60/285
(58) Field of Classification Search ........... 60/274, 60/276, 277, 284, 285
See application file for complete search history.

(56) References Cited

U.S. PATENT DOCUMENTS

| | | | |
|---|---|---|---|
| 5,325,664 A | | 7/1994 | Chikamatsu |
| 5,526,643 A | * | 6/1996 | Mukaihira et al. ............ 60/276 |
| 5,590,521 A | | 1/1997 | Schnaibel et al. |
| 5,675,967 A | * | 10/1997 | Ries-Mueller ............... 60/274 |
| 5,743,083 A | * | 4/1998 | Schnaibel et al. ............ 60/274 |
| 5,896,743 A | * | 4/1999 | Griffin ........................ 60/274 |
| 5,930,993 A | * | 8/1999 | Kammann et al. ............ 60/274 |
| 5,987,883 A | | 11/1999 | Schneider |
| 6,092,369 A | | 7/2000 | Hidal |
| 6,195,986 B1 | * | 3/2001 | Davey et al. ................. 60/274 |
| 6,202,406 B1 | * | 3/2001 | Griffin et al. ................ 60/274 |

FOREIGN PATENT DOCUMENTS

| | | |
|---|---|---|
| EP | 0626507 | 11/1994 |
| GB | 2349226 | 10/2000 |
| JP | 07 180534 | 7/1995 |
| JP | 11 132031 | 5/1999 |

* cited by examiner

*Primary Examiner*—Bihn Q. Tran
(74) *Attorney, Agent, or Firm*—Walter Ottesen

(57) ABSTRACT

A control for diagnosing a catalytic converter in the exhaust gas of an internal combustion engine having means for determining the catalytic converter temperature is presented. The diagnostic method is carried out in dependence upon the catalytic converter temperature. In the diagnosis, only such results are used which have been determined below a threshold value for the catalytic converter temperature.

5 Claims, 2 Drawing Sheets

METHOD FOR CONTROL OF A DIAGNOSIS OF A CATALYST IN THE EXHAUST OF AN INTERNAL COMBUSTION ENGINE

RELATED APPLICATIONS

This application is the national stage of PCT/DE 01/04920, filed Dec. 22, 2001, designating the United States and claiming priority from German patent application no. 100 65 123.2, filed Dec. 28, 2000, the entire content of which is incorporated herein by reference.

FIELD OF THE INVENTION

The invention relates to a method for diagnosing catalytic converters which are used to convert toxic substances in the exhaust gas of internal combustion engines.

BACKGROUND OF THE INVENTION

Statutory requirements provide an on-board diagnosis of toxic-emission relevant vehicle components such as catalytic converters.

Such an on-board diagnosis is known, for example, from U.S. Pat. No. 5,987,883. A correction of the conversion capability, which is determined with on-board means, for considering temperature influences on the diagnostic result is known from U.S. Pat. No. 5,526,643. Here, a diagnosis takes place only above a minimum temperature threshold.

There is further an interest to increase the quality and therewith the reliability of the diagnostic statements.

SUMMARY OF THE INVENTION

The subject matter of the present invention increases the reliability of the diagnostic statements in that only such diagnostic results are evaluated where the temperature of the catalytic converter was below a highest temperature threshold for the determination of these diagnostic results.

This technical teaching is based on the observation that a deteriorated catalytic converter can effect the same toxic substance conversion at very high temperatures of, for example, 800° C. as can a new catalytic converter at 400° C. By limiting the diagnosis to catalytic converter temperatures below a highest temperature threshold, the situation is precluded that a deteriorated catalytic converter is evaluated as being operational based only on a high diagnostic temperature.

An advantageous configuration results in that, during the drop of the catalytic converter temperature below the highest temperature threshold, a waiting time must elapse before a catalytic converter diagnosis takes place or before results are determined which are evaluated in a diagnosis. This waiting time can be dependent upon the speed with which the catalytic converter temperature drops. The waiting time for higher rates of change of the catalytic converter temperature are selected longer than for lower rates of change.

In this way, the especially significant advantage results that a diagnosis for a steep drop of the catalytic converter temperature from a very high level is delayed longer than in a flat temperature course. The longer delay with a steep course allows the catalytic converter more time for reaching a thermal steady state condition in the diagnostic temperature range between lowest and highest temperatures. For a flat temperature course, a long wait is not required and the diagnosis can begin earlier.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
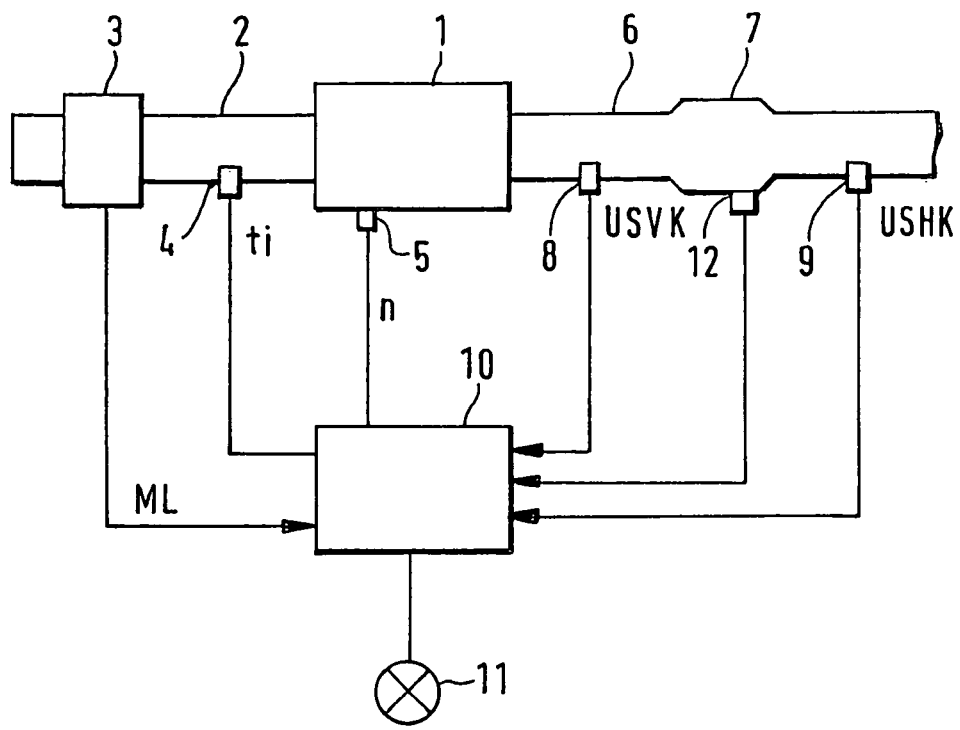
FIG. 1 shows the technical background of the invention.

FIG. 1 shows in detail an internal combustion engine 1 having an intake manifold 2, load detecting means 3, fuel metering means 4, an rpm sensor 5, an exhaust-gas system 6, a catalytic converter 7, exhaust-gas probes 8 and 9, a control apparatus 10 and means 11 for displaying a fault.

The control apparatus 10 receives the signals ML of the load detecting means, (n) of the rpm sensor and the signals USVK and USHK of the two exhaust-gas probes and forms therefrom, inter alia, a fuel-metering signal ti, for example, an injection pulse width for driving injection valves 4 as fuel-metering means. For this purpose, a base value t1 of the drive signal ti is determined for the fuel-metering means as a function of the inducted air mass ML and the engine speed (n). This base value is multiplicatively corrected in a closed control loop by a control actuating quantity FR. This control actuating quantity FR is generated in a manner known per se by applying a PI control strategy to the deviation of the probe signal USVK from a desired value. In the formation of the fuel-metering signal, the signal USHK can be included in the computation additionally, for example, for forming the desired value. A temperature sensor 12 supplies a signal as to the catalytic converter temperature TKAT to the control apparatus. Alternatively, the catalytic converter temperature TKAT can also be determined in the control apparatus 10 from other measurement quantities, especially, from the air quantity ML and the rpm (n) utilizing a computer model. One such temperature modeling is, for example, disclosed in U.S. Pat. No. 5,590,521.

In this technical background, the method of the invention can be carried in the embodiment shown in FIG. 2.

Figure 2A:
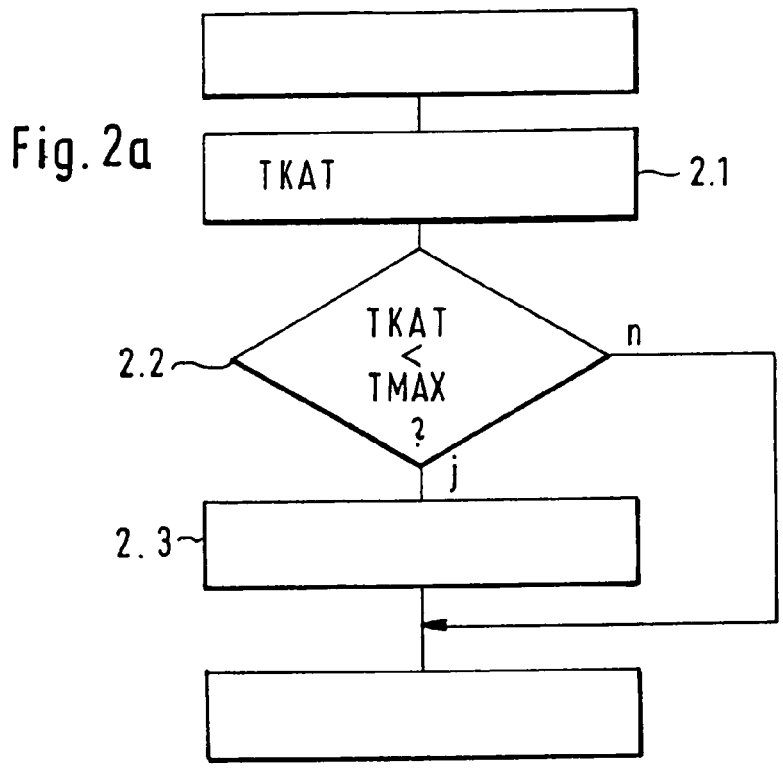

Step 2.1 in FIG. 2a is reached from a higher-order engine control program and serves for determining the catalytic converter temperature TKAT. In step 2.2, a comparison of the catalytic converter temperature TKAT to a predetermined maximum value TMAX takes place. If the TMAX-value is exceeded, then no diagnosis takes place and the main program is continued. If, in contrast, the catalytic converter temperature TKAT remains below the threshold value TMAX, then the diagnosis is permitted in step 2.3 and the main program is continued after the diagnosis.

In this way, only such results are used for diagnosis where these results were determined with the catalytic converter temperature lying below the threshold value TMAX.

When the diagnosis, for example, is based on a quotient of the signals of the exhaust-gas probes forward and rearward of the catalytic converter, then this can mean that the quotient is formed only for a permitted diagnosis. Alternatively, the quotient can be formed continuously but the quotient can be evaluated only for permitted diagnoses.

This distinction applies in the same manner for other diagnostic methods.

Figure 2B:
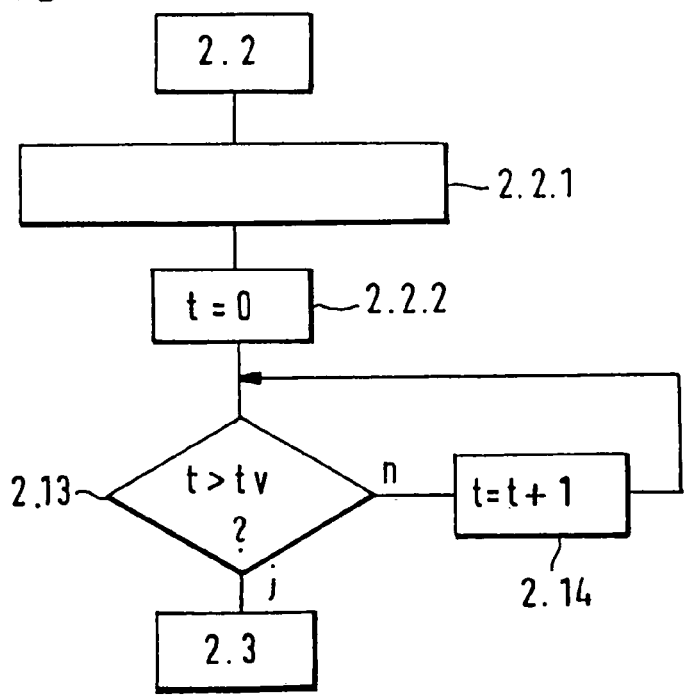

FIG. 2b shows a supplement of FIG. 2a as an additional embodiment. According to this embodiment, the determination of a waiting time tv comes after step 2.2 in a step 2.2.1 and the initialization of a count variable t (t=0) is made in step 2.2.2. The waiting time tv can be a fixed value. Alternatively, tv can be dependent upon operating parameters of the engine or the exhaust-gas system. A dependency of the waiting time tv on the speed of the change of the catalytic converter temperature when there is a drop below TMAX is especially advantageous. The dependency tv=F (d/dt(TKAT)) is to be so designed that the waiting time tv is that much longer the steeper the course of TKAT is when passing the threshold value TMAX. The steps 2.13 and 2.14 form a waiting loop which is run through so often until the waiting time has elapsed. In this case, the program is continued with step 2.3 and the diagnosis is thereby enabled.

Figure 3:
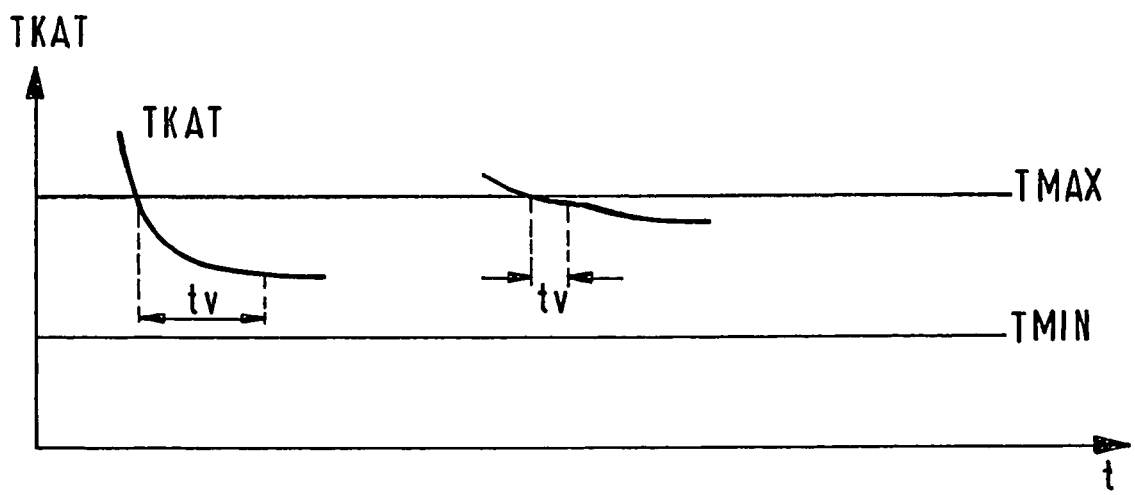
FIG. 2 shows a flowchart as an embodiment of the method of the invention and FIG. 3 shows possible courses of the catalytic converter temperature as a function of time.

FIG. 3 shows the various waiting times in dependence upon the time derivative of the temperature TKAT when there is a drop below the threshold value TMAX.

The invention claimed is:

1. A method for controlling the diagnosis of a catalytic converter in the exhaust gas of an internal combustion engine having means for determining the temperature of said catalytic converter, the method comprising the steps of:

carrying out the diagnosis in dependence upon said temperature of said catalytic converter; and, utilizing only such results for said diagnosis which were determined below a threshold value (TMAX) for said temperature of said catalytic converter and for which results said temperature of said catalytic converter was below said threshold value (TMAX) for a predetermined waiting time.

2. The method of claim 1, wherein said temperature of said catalytic converter must lie within a temperature interval (TMAX, TMIN).

3. The method of claim 1, wherein the length of the predetermined waiting time is dependent upon the speed with which the catalytic converter temperature drops.

4. A method for controlling the diagnosis of a catalytic converter in the exhaust gas of an internal combustion engine having means for determining the temperature of said catalytic converter, the method comprising the steps of:

carrying out the diagnosis in dependence upon said temperature of said catalytic converter;

utilizing only such results for said diagnosis which were determined below a threshold value (TMAX) for said temnerature of said catalytic converter and for which results said temperature of said catalytic converter was below said threshold value (TMAX) for a predetermined waiting time;

wherein the length of the predetermined waiting time is dependent upon the speed with which the catalytic converter temperature drops; and, the predetermined waiting time for higher temperature rates of change is selected longer than for lower temperature rates of change.

5. An arrangement for diagnosing a catalytic converter in the exhaust gas of an internal combustion engine, the arrangement comprising:

means for determining the temperature of said catalytic converter;

means for comparing said temperature of said catalytic converter to a predetermined threshold value (TMAX);

decision means for utilizing only such results for said diagnosis which were determined below said threshold value (TMAX) for said temperature of said catalytic converter; and, said comparing means functioning to use only said results for which said temperature of said catalytic converter was below said threshold value (TMAX) for a predetermined waiting time.

* * * * *

UNITED STATES PATENT AND TRADEMARK OFFICE
CERTIFICATE OF CORRECTION

| | | |
|---|---|---|
| PATENT NO. | : 7,146,798 B2 | Page 1 of 1 |
| APPLICATION NO. | : 10/433982 | |
| DATED | : December 12, 2006 | |
| INVENTOR(S) | : Erich Schneider and Andreas Blumenstock | |

It is certified that error appears in the above-identified patent and that said Letters Patent is hereby corrected as shown below:

In the Title Page:
Under (86) PCT No.: delete "Apr. 2, 2002" and substitute -- Apr. 2, 2004 -- therefor.

Under (30) Foreign Application Priority Data: delete "Dec. 28, 2002" and substitute -- Dec. 28, 2000 -- therefor.

Under *Primary Examiner*: delete "Bihn Q. Tran" and substitute -- Binh Q. Tran -- therefor.

Signed and Sealed this

Twenty-sixth Day of February, 2008

JON W. DUDAS
*Director of the United States Patent and Trademark Office*